(12) United States Patent
Simpson

(10) Patent No.: US 12,188,133 B2
(45) Date of Patent: Jan. 7, 2025

(54) CABLE-TO-PIPE CONNECTOR

(71) Applicant: Bradley Anthony Simpson, Leduc County (CA)

(72) Inventor: Bradley Anthony Simpson, Leduc County (CA)

( * ) Notice: Subject to any disclaimer, the term of this patent is extended or adjusted under 35 U.S.C. 154(b) by 356 days.

(21) Appl. No.: 17/580,174

(22) Filed: Jan. 20, 2022

(65) Prior Publication Data

US 2023/0227982 A1 Jul. 20, 2023

(51) Int. Cl.
| | | |
|---|---|---|
| *C23F 13/06* | (2006.01) | |
| *C08K 3/30* | (2006.01) | |
| *C08L 33/24* | (2006.01) | |
| *F16B 1/00* | (2006.01) | |
| *F16B 33/00* | (2006.01) | |
| *H01R 4/64* | (2006.01) | |

(52) U.S. Cl.
CPC .............. *C23F 13/06* (2013.01); *C08L 33/24* (2013.01); *F16B 1/00* (2013.01); *F16B 33/008* (2013.01); *H01R 4/64* (2013.01); *C08K 2003/3009* (2013.01); *C08L 2203/20* (2013.01); *F16B 2200/93* (2023.08)

(58) Field of Classification Search
CPC ........... C08L 2203/20; C08L 2203/202; C08L 2203/206; C08L 33/00; C08L 33/24; C08K 2003/3009; C08K 3/014; C08K 3/30; F16B 2200/00; F16B 2200/93; F16B 1/00; F16B 1/02; F16B 33/00; F16B 33/006; F16B 33/008; F16B 35/00; F16B 37/06; F16B 41/00; H01R 4/30; H01R 4/34; H01R 4/64; H01R 4/643; H01R 4/646; H01R 4/70; H01R 11/12; H01R 11/26; C23F 13/06; C23F 13/08; C23F 13/10; C23F 13/12; C23F 13/14; C23F 13/16; C23F 13/18; C23F 13/20
USPC ........................................................ 439/207
See application file for complete search history.

(56) References Cited

U.S. PATENT DOCUMENTS

| | | | |
|---|---|---|---|
| 5,090,924 A | 2/1992 | Pfaller et al. | |
| 5,372,687 A | 12/1994 | Pohto et al. | |
| 5,912,434 A * | 6/1999 | Robinson | H02B 1/305 |
| | | | 174/659 |
| 6,343,962 B2 | 2/2002 | Krause | |
| 6,725,925 B2 | 4/2004 | Al-Ramadhan | |
| 7,081,187 B1 | 7/2006 | Schutt | |

(Continued)

FOREIGN PATENT DOCUMENTS

| | | |
|---|---|---|
| CA | 2316983 C | 5/2000 |
| CN | 202936484 U | 5/2013 |

*Primary Examiner* — Anthony R Jimenez
(74) *Attorney, Agent, or Firm* — Orin Del Vecchio

(57) ABSTRACT

A cable-to-pipe connector is provided. A cable-to-pipe connector for providing continuous transfer of current from a cable to a utility pipe in above grade and below grade systems, comprising a conductive lug comprising a head at a top end of the conductive lug affixed to a noncircular neck that is further affixed to a body in a linear formation, the head, the neck, and the body having decreasing diameters respectively. An insulating shell partially encasing by the conductive lug. A horizontal aperture at a midway point of the head. A first fastener extending from above a top of the head through the horizontal aperture. A threaded member at a base end of the conductive lug and a bottom end of the insulation shell.

8 Claims, 6 Drawing Sheets

(56) References Cited

U.S. PATENT DOCUMENTS 8,557,089 B2 10/2013 Schutt
9,735,478 B2 8/2017 Frenken

* cited by examiner

CABLE-TO-PIPE CONNECTOR

FIELD OF THE INVENTION

The present disclosure relates to a cable-to-pipe connector, more specifically, but not by way of limitation, more particularly to a cable-to-pipe connector for providing continuous transfer of current from a cable to a utility pipe while electrically isolating the cable and pipe from the metal housing.

BACKGROUND

Any discussion of the related art throughout the specification should in no way be considered as an admission that such related art is widely known or forms part of common general knowledge in the field.

Any metal structure surrounded by an electrolyte, such as water or soil, will corrode over time. The corrosion is caused from defects or discontinuities on the outer painted or coated surface of the metal structure. Cathodic protection is typically employed to eliminate or slow the corrosion of any metal structures surrounded by an electrolyte, such as another pipe or a metal grating, and is most often employed to stop corrosion on the exterior of the piping that is in contact with the soil.

Cathodic protection is used to protect below grade and above grade pipelines, such as oil, gas, and water, from external corrosion where the pipeline is in contact with an electrolyte, such as soil. Cables used to connect the cathodic protection source, impressed current rectifier or sacrificial anode, to the pipeline are connected using various methods. Above grade connections typically use a flat flange tab installed flush against the pipe flange face with a hole for which the flange bolt can pass through.

A bolt nut is typically used to tighten the flange faces together to hold the flange tab in place against the flange face. The flange tab is often connected to a metal electrical housing via a national pipe thread metal plug independently made by various cathodic suppliers. Each supplier typically makes their own version of the plug. However, all plugs currently in use are metal and therefore allow for an electrical bridge between the pipe and the metal housing. The housing, if joined to other piping with metal sheathing teck cable, then becomes an electrical conductor rather than the cable inserted inside of it. This can cause inaccurate amperage measurements as well as electrical faults and shorts to other metallic structures they come into contact with, as well as the risk of a sparking hazard in possible gaseous environments.

CA Pub. No. 2,316,983 C (Davison et. al.) discloses an assembly for use in the cathodic protection of steel reinforcement in reinforced concrete.

CN Pub. No. 202,936,484 U (Wei et. al.) discloses a cathode protection system for an underground pipeline system with a waterproof sleeve.

U.S. Pat. No. 6,343,962 B2 (Krause) discloses a cable lug with a defined contact surface.

U.S. Pat. No. 6,725,925 B2 (Al-Ramadhan) discloses a downhole cathodic protection cable system cable lug with a defined contact surface.

U.S. Pat. No. 7,081,187 B1 (Schutt) discloses an internal cathodic protection system for internal surfaces of a pipeline.

U.S. Pat. No. 9,735,478 B2 (Frenken) discloses a cable lug.

Shortcomings of Davison et. al, Wei et. al., Krause, Al-Ramadhan, Schutt, and Frenken all include an inability to use in above grade or below grade cable to pipe systems to provide continuous transfer of electricity from an electrical cable to a utility pipe while electrically isolating the cable and pipe from a metal housing, doesn't employ a non-conductive plug to eliminate potential faults/shorts to other metallic structures that the system comes into contact with and an inability to constrain amperage to the intended bonding cable within the metal housing and teck cable with metal sheathing to eliminate the risk of a sparking hazard in possible gaseous environments.

U.S. Pat. No. 5,090,924 A (Pfaller et. al.) discloses a tubular cathodic protection anode and anode.

U.S. Pat. No. 5,372,687 A (Pohto et. al.) discloses a cathodic protection anode assembly for metal structures in water with an insulating sleeve.

U.S. Pat. No. 8,557,089 B2 (Schutt) discloses an impressed current cathodic protection system for marine applications.

Shortcomings of Pfaller et. al., Pohto et. al., and Schutt all include an inability to use in above grade or below grade cable to pipe systems to provide continuous transfer of electricity from an electrical cable to a utility pipe while electrically isolating the cable and pipe from a metal housing and an inability to constrain amperage to the intended bonding cable within the metal housing and teck cable with metal sheathing to eliminate the risk of a sparking hazard in possible gaseous environments.

All documents cited herein are incorporated by reference.

It is clear that there exists a need for a cable-to-pipe connector for providing continuous transfer of current from a cable to a utility pipe while electrically isolating the cable and pipe from the metal housing. There is a need for a cable-to-pipe connector that employs a non-conductive plug to eliminate potential faults/shorts to other metallic structures that the system comes into contact with, that promotes fast and straightforward installation and only allows amperage to travel down the intended bonding cable within the metal housing and teck cable with metal sheathing to eliminate the risk of a sparking hazard in possible gaseous environments.

BRIEF SUMMARY

It is an object of the invention to provide a cable-to-pipe connector for providing continuous transfer of electricity from an electrical cable to a utility pipe while electrically isolating the cable and pipe from the metal housing.

In accordance with an aspect of the invention, there is provided a cable-to-pipe connector comprising a head at a top end of the conductive lug affixed to a noncircular neck that is further affixed to a body in a linear formation, the head, the neck, and the body having decreasing diameters respectively. An insulating shell partially encasing by the conductive lug. A horizontal aperture at a midway point of the head. A first fastener extending from above a top of the head through the horizontal aperture, wherein the first fastener is optionally coupled to the head to be threaded inward to block the horizontal aperture and to be threaded outward to be removed from the head. A threaded member at a base end of the conductive lug, wherein the threaded member may be optionally coupled to one or more second fasteners and a noncircular center channel through a top end of the insulation shell and a bottom end of the insulation shell, wherein the conductive lug is optionally inserted into the insulation shell such that the threaded member protrudes outward from the bottom end of the insulation shell, the neck is secured to the noncircular center channel and the conductive lug is unable to rotate and the head lays flush against the top end of the insulation shell.

In accordance with another aspect of the invention, there is provided a method of employing the cable-to-pipe connector to a cable-to-pipe cathodic system to eliminate voltage/amperage from conducting on or through a metal housing or a metal teck cable sheathing, the method comprising inserting a portion of the cable-to-pipe connector into a metal house connected to the cable such that the head of the conductive lug and a portion of the insulating shell are contained within the metal housing and a remaining portion of the insulating shell and the threaded member of the conductive lug are outside of the metal housing. Placing a wire from the cable within the metal housing into the aperture of the conductive lug. Securing the wire to the conductive lug via the first fastener and connecting a flange tab that is coupled to the pipe to the threaded member via the one or more second fasteners.

In accordance with an embodiment of the invention, the insulating shell is composed of nylatron.

In accordance with an embodiment of the invention, the insulating shell is black.

In accordance with an embodiment of the invention, the conductive lug is composed of stainless steel.

In accordance with an embodiment of the invention, the neck and the center channel are hexagonal.

In accordance with an embodiment of the invention, the wire is an electrical wire.

In accordance with an embodiment of the invention, the wire is a cathodic wire.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Figures 1A, 1B:
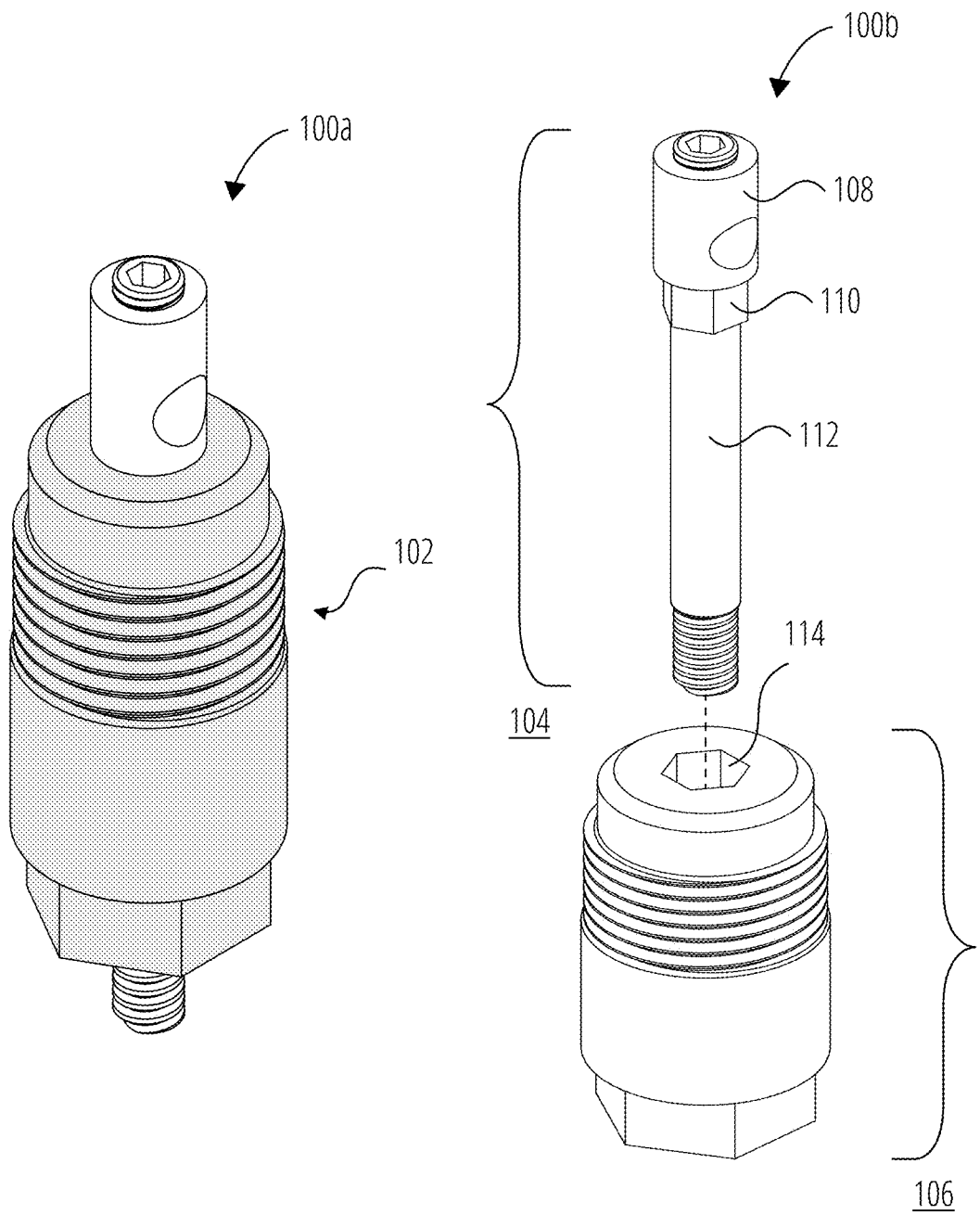

Embodiments will now be described, by way of example only, with reference to the attached figures, wherein the figures:

FIG. 1A illustrates a perspective view of a cable-to-pipe connector, in accordance with one embodiment.

FIG. 1B illustrates perspective views of a conductive lug and an insulating shell of a cable-to-pipe connector, in accordance with one embodiment.

Figures 2A, 2B, 2C:
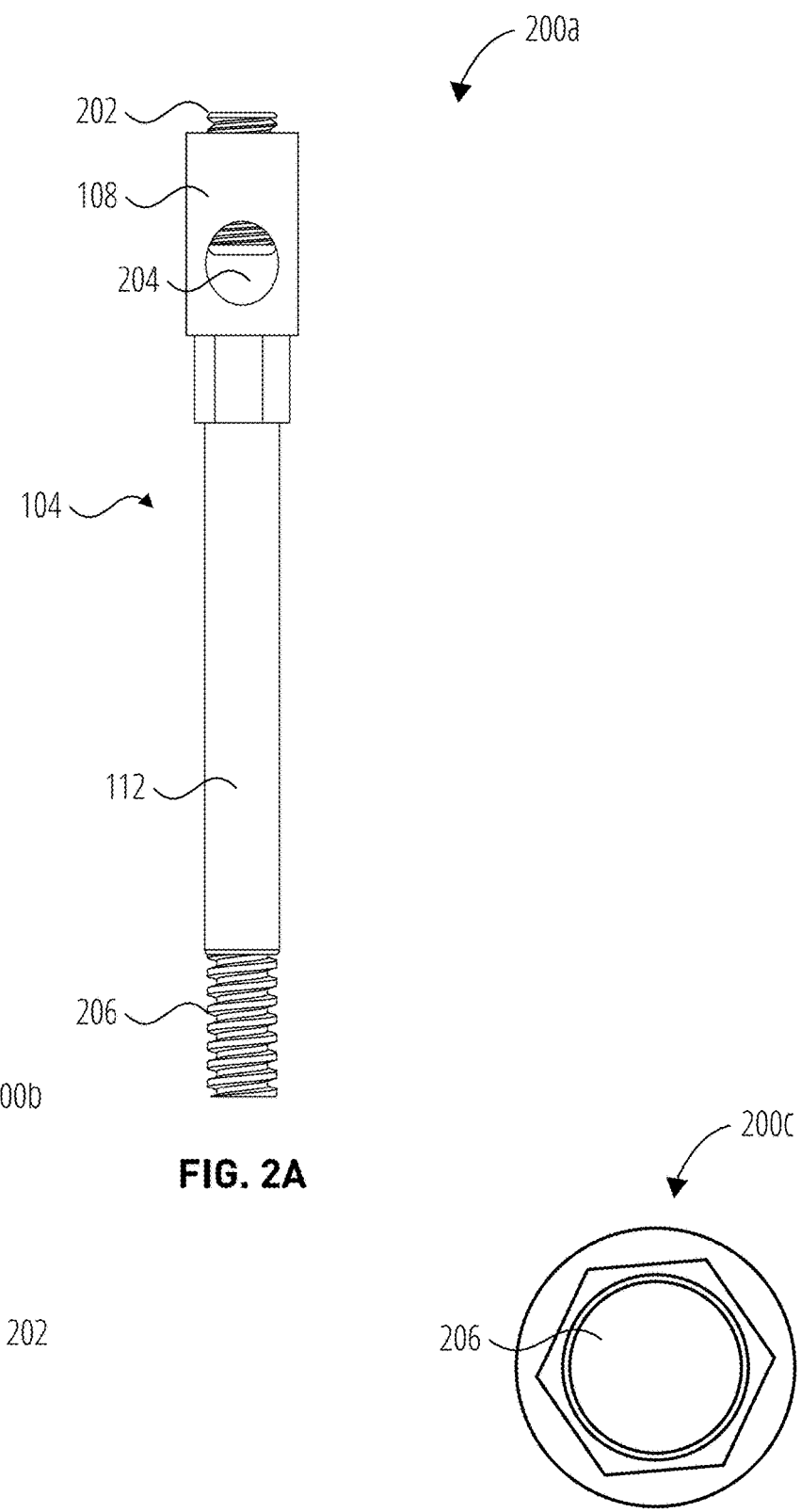

FIG. 2A illustrates a front view of a conductive lug of a cable-to-pipe connector, in accordance with one embodiment.

FIG. 2B illustrates a top view of a conductive lug of a cable-to-pipe connector, in accordance with one embodiment.

FIG. 2C illustrates a bottom view of a conductive lug of a cable-to-pipe connector, in accordance with one embodiment.

Figure 3A:
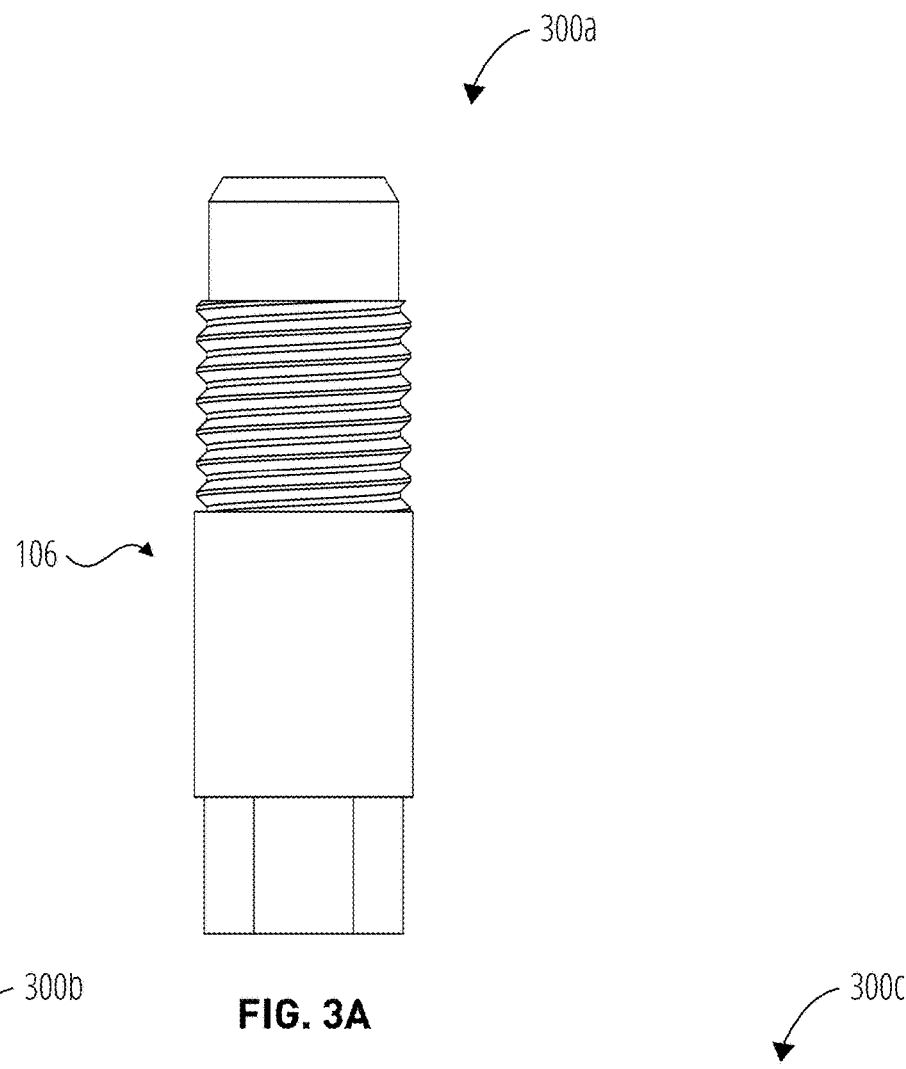

FIG. 3A illustrates a front view of an insulating shell of a cable-to-pipe connector, in accordance with one embodiment.

Figure 3B:
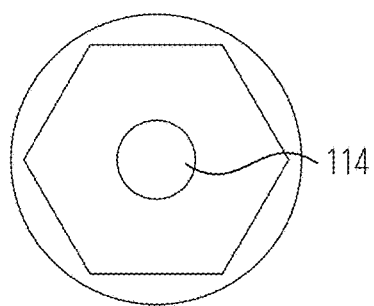

FIG. 3B illustrates a top view of an insulating shell of a cable-to-pipe connector, in accordance with one embodiment.

Figure 3C:
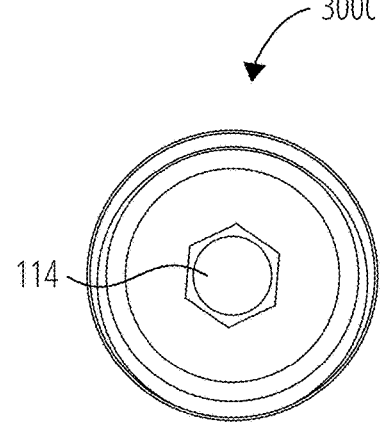

FIG. 3C illustrates a bottom view of an insulating shell of a cable-to-pipe connector, in accordance with one embodiment.

Figure 4A:
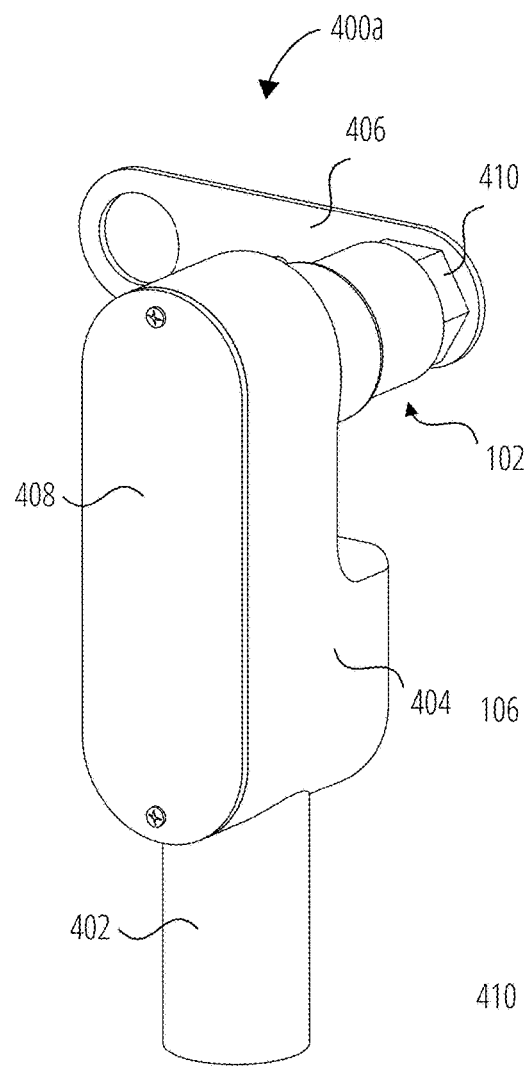

FIG. 4A illustrates a sectional view of a cable-to-pipe connector in connection with a teck cable, metal housing and flange tab, in accordance with one embodiment.

Figure 4B:
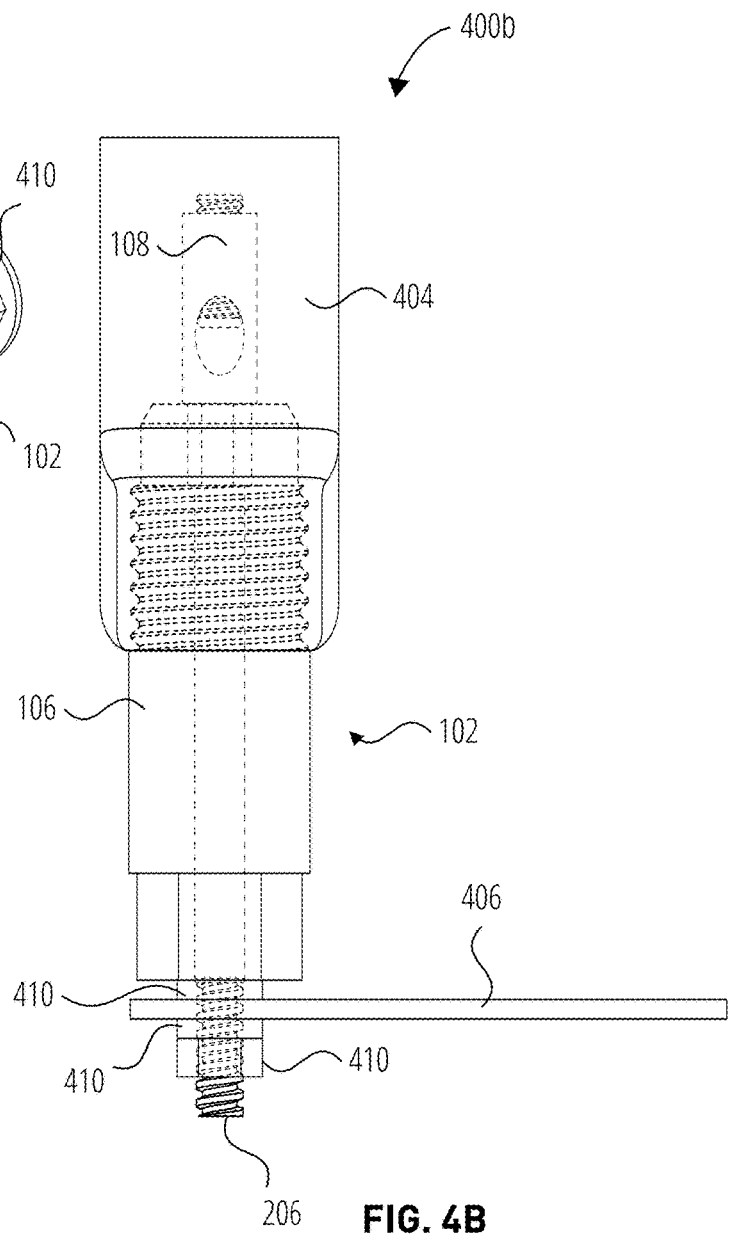

FIG. 4B illustrates a sectional view 400b of a cable-to-pipe connector in connection with a teck cable, metal housing and flange tab, in accordance with one embodiment.

Figure 5A:
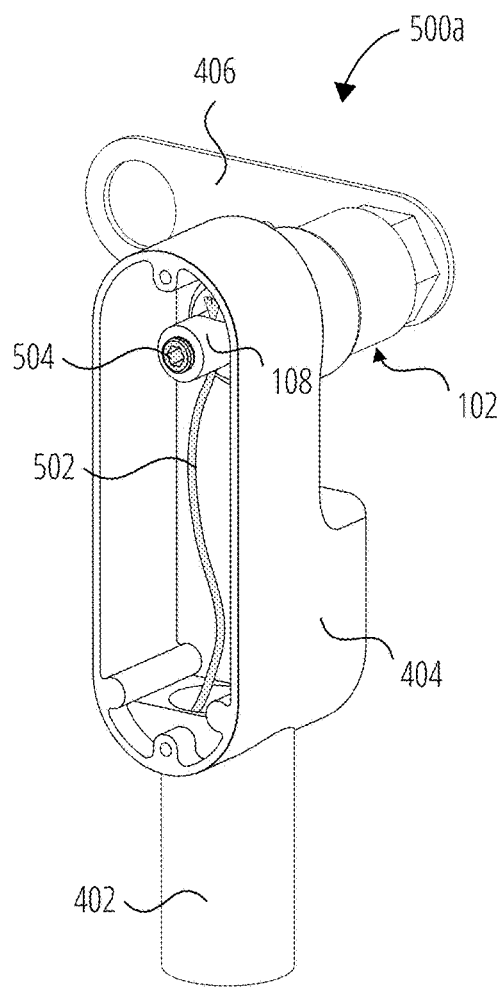

FIG. 5A illustrates a perspective view of a cable-to-pipe connector in connection with a teck cable, metal housing and flange tab, in accordance with one embodiment.

Figure 5B:
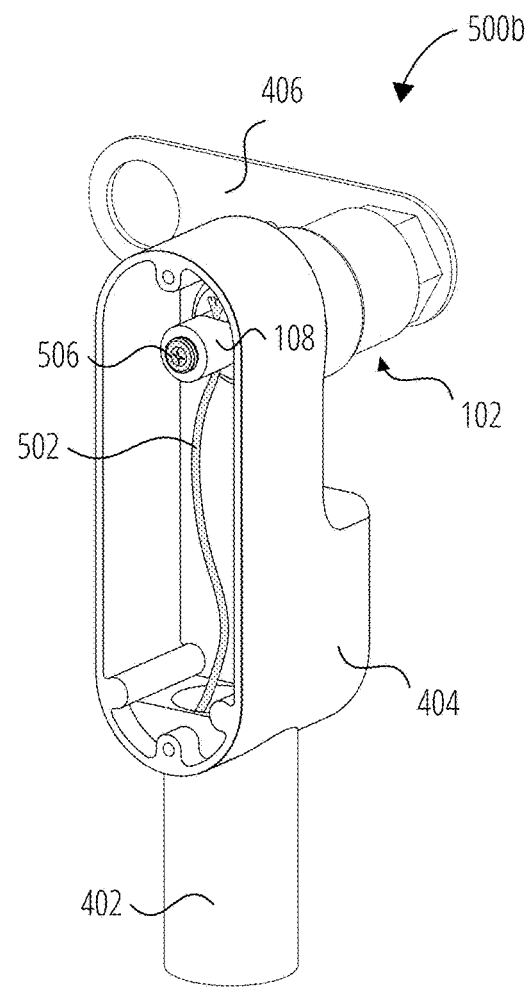

FIG. 5B illustrates a sectional view of a cable-to-pipe connector in connection with a metal housing and flange tab, in accordance with one embodiment.

Figure 6:
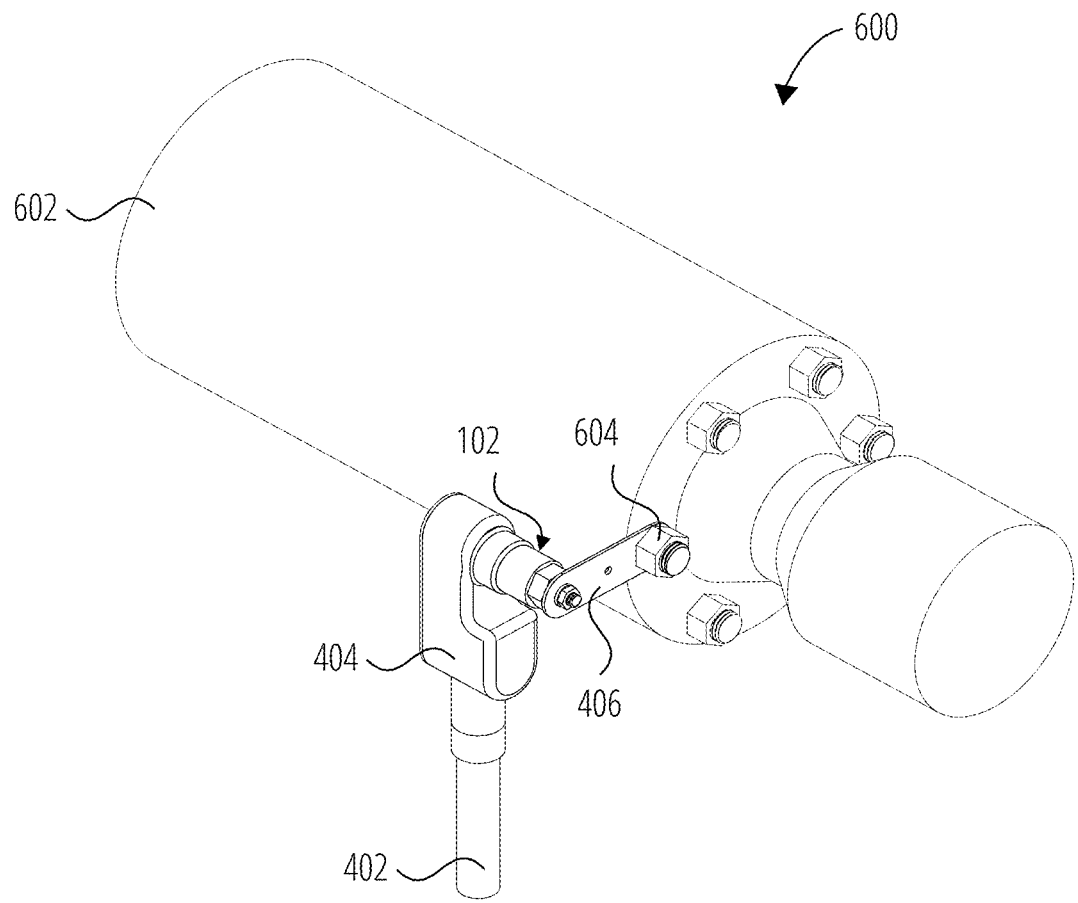

FIG. 6 illustrates a perspective view of a cable-to-pipe connector in connection with a teck cable, metal housing, flange tab and a pipe, in accordance with one embodiment.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

The present invention provides a cable-to-pipe connector that may be used with many different embodiments. As such, the general purpose of the present invention, which will be described subsequently in greater detail, is to provide a new and improved cable-to-pipe connector for providing continuous transfer of electricity from an electrical cable to a utility pipe while electrically isolating the cable and pipe from the metal housing, which provides the advantages and overcomes the aforementioned disadvantages.

A cable-to-pipe connector for providing continuous transfer of current from a cable to a utility pipe in above grade and below grade systems is presented herein. The cable-to-pipe connector comprises a conductive lug partially encased by an insulating shell.

The conductive lug comprises a head at a top end of the conductive lug affixed to a noncircular neck that is further affixed to a body in a linear formation and the head, the neck and the body have decreasing diameters respectively. The head has a horizontal aperture at a midway point of the head and a fastener extending from above a top of the head through the horizontal aperture, where the fastener is optionally coupled to the head to be threaded inward to block the horizontal aperture and to be threaded outward to be removed from the head. The body has a threaded member at a base end of the conductive lug, where the threaded member may be optionally coupled to one or more fasteners.

The insulating shell has a noncircular center channel through a top end of the insulation shell and a bottom end of the insulation shell, where the conductive lug is optionally inserted into the insulation shell such that the threaded member protrudes outward from the bottom end of the insulation shell, the neck is secured to the noncircular center channel and the conductive lug is unable to rotate and the head lays flush against the top end of the insulation shell.

FIG. 1A illustrates a perspective view 100a of a cable-to-pipe connector 102, according to some embodiments. The cable-to-pipe connector 102 is shown with the conductive lug 104 inserted into the insulating shell 106 with elements of the conductive lug 104 protruding out of the top and bottom of the insulating shell 106. In some embodiments, the insulating shell 106 is composed of a nylatron. Nylatron is a non-conductive material used due to its UV resistivity, durability, high melting point and ability to withstand hot and cold temperatures. In some embodiments, the insulating shell 106 is black. In some embodiments, the conductive lug 104 is composed of stainless steel, which significantly reduces corrosion.

FIG. 1B illustrates an exploded view 100b of a cable-to-pipe connector 102, according to some embodiments. The conductive lug 104 shown comprises a head 108 at a top end affixed to a noncircular neck 110 that is further affixed to a body 112 in a linear manner. The head 108, neck 110 and body 112 are composed of a conductive material that promotes the transfer of electrical current through the entirety of the conductive lug 104. Conversely, the insulating shell 106 is composed of a nonconductive material to inhibits the transfer of electrical current from the conductive lug 104 through the insulating shell 106.

Furthermore, the head, the neck and the body are shown having decreasing diameters respectively. This an important feature for the assembly of the cable-to-pipe connector 102, which is accomplished by inserting the body 112 end of the conductive lug 104 into a center channel 114 of the insulating shell 106. Once inserted into the center channel 114, the body 112 of the conductive lug 104 is largely enclosed by the insulating shell 106 and the head 108 of the conductive lug 104 rests of the top of the insulating shell 106 and a portion of the body 112 protrudes out from the bottom of the insulating shell 106, as shown in FIG. 1A.

The decreasing diameters for the head 108, neck 110 and body 112 allow for the assembly and disassembly of the cable-to-pipe connector 102 to be quite fast and straightforward. This due to the loose fit between the body 112 and the center channel 114 that promotes rapid insertion and a snug and secure fit between the neck 110 and the center channel 114 while having the head lay on the top of the insulating shell 106 that fixes the conductive lug 104 in place.

FIG. 2A illustrates a front view 200a of a conductive lug 104, according to some embodiments. The head 108 of the conductive lug 104 is shown comprising a fastener 202 and an aperture 204 where the aperture 204 is located at a midway point of the head 108 and the fastener 202 extends from above the top of the head 108 through the aperture 204. In some embodiments, the fastener 202 is coupled to the head 108 such that the fastener 202 can be threaded downward to block the aperture 204 as well as threaded upward to be removed from the head 108.

The body 112 of the conductive lug 104 is shown comprising a threaded member 206 at the bottom end of the conductive lug 104. When the conductive lug 104 is inserted into the insulating shell 106, the body 112 is enclosed by the insulating shell 106 with the threaded member 206 protruding out from the center channel 114 and the bottom of the insulating shell 106.

FIG. 2B illustrates a top view 200b of a conductive lug 104, according to some embodiments. The fastener 202 employed in the conductive lug 104 can be any fastener known in the art, such as but not limited to screws, nuts, bolts, and washers.

FIG. 2C illustrates a bottom view 200c of a conductive lug 104, according to some embodiments. The threaded member 206 employed in the conductive lug 104 can be any fastener known in the art, such as but not limited to screws, nuts, bolts, and washers.

FIG. 3A illustrates a front view 300a of an insulating shell 106, according to some embodiments.

FIG. 3B illustrates a top view 300b of an insulating shell 106, according to some embodiments. The top end of the insulating shell 106 is shown with the entrance to the center channel 114, the shape of the center channel 114 can be any shape known in the art, such as but not limited to circular and hexagonal.

FIG. 3C illustrates a bottom view 300c of an insulating shell 106, according to some embodiments. The bottom end of the insulating shell 106 is shown with the exit to the center channel 114, the shape of the center channel 114 can be any shape known in the art, such as but not limited to circular and hexagonal.

FIG. 4A illustrates a perspective view 400a of a cable-to-pipe connector 102 connected to a teck cable 402, a metal housing 404 and a flange tab 406, according to some embodiments. The metal housing 404 is shown with a front plate 408 for shielding the connection between the teck cable 402 and the cable-to-pipe connector 102. The flange tab 406 is shown connected to the cable-to-pipe connector 102 via a fastener 410.

In some embodiments, the neck 110 and the center channel 114 are of the same diameter and noncircular shape such as the hexagonal shape shown in FIG. 1B. This similar diameter and hexagonal shape of the neck 110 and the center channel 114 functions to prevent the conductive lug 104 from rotating, which is essential when tightening and loosening the fastener 202 or applying one or more fasteners 410 to the threaded member 206.

FIG. 4B illustrates a sectional view 400b of a cable-to-pipe connector 102 connected to a metal housing 404 and a flange tab 406, according to some embodiments. The cable-to-pipe connector 102 is shown partially encased within the metal housing 404. More specifically, the head 108 of the conductive lug 104 and a portion of the insulating shell 106 are contained within the metal housing 404. The metal housing 404 is utilized for shielding the connection between the teck cable 402 and the cable-to-pipe connector 102 while the insulating shell 106 removes the metal housing 404 from the electrical circuit. The remaining portion of the insulating shell 106 is shown below the metal housing 404 and a flange tab 406 is connected to the threaded member 206 of the conductive lug 104 via a plurality of fasteners 410, which allows for the flange tab 406 to be included in the electrical circuit.

This assembly eliminates the possibility of voltage/amperage from conducting on or through the metal housing 404 or metal teck cable sheathing, therefore not allowing the intended cable to be the conductor, which can lead to inaccurate amperage bond current readings and making other parts to the system continuous to the cathodic current such as metal junction boxes, cable trays and other metallic objects electrically continuous to the metal housing 404 or metal teck cable sheathing. Furthermore, the quick connect stainless steel conductive lug 104 does not require a stud with the lug or stud with an electrical ring terminal crimp for the cable connection that is employed in some prior art, which eliminates a resistive connection and lessens sparking hazards. The reduction in physical connections compared to the prior art also contributes to less resistance, better amperage transfer, and less problems with connections becoming loose.

FIG. 5A illustrates a perspective view 500a of a cable-to-pipe connector 102 connected to a teck cable 402, a metal housing 404 and a flange tab 406, according to some embodiments. An electrical wire 502 from the teck cable 402 is shown within the metal housing 404. The end of the electrical wire 502 is placed into the aperture 204 from the head 108 of the conductive lug 104 and secured via tightening the fastener 202. This embodiment displays a fastener with a slot head 504. In some embodiments, the teck cable 402 more have one or multiple electrical wires 502 which are secured to conductive lug 104 via the fastener 410. This allows for accommodation for single or multiple conductors. In some embodiments a cathodic wire from a teck cable 402 may be contained within the metal housing 404 with the end of the cathodic wire placed into the aperture 204 from the head 108 of the conductive lug 104 and secured via tightening the fastener 202.

FIG. 5B illustrates a perspective view 500b of a cable-to-pipe connector 102 connected to a teck cable 402, a metal housing 404 and a flange tab 406, according to some embodiments. Similar to FIG. 5A, this example displays an electrical wire 502 from the teck cable 402 within the metal housing 404 with the end of the electrical wire 502 placed into the aperture 204 from the head 108 of the conductive lug 104 and secured via tightening the fastener 202. This embodiment displays a fastener with a cross head 506. Fasteners with heads such as but not limited to, torx, allen, robertson or any other fasteners known in the art.

FIG. 6 illustrates a perspective view 600 of a cable-to-pipe connector 102 connected to a flange tab 406 that is further connected to a pipe flange 604 and a pipe 602, according to some embodiments. The cable-to-pipe cathodic protection system displayed electrically isolates the teck cable 402 and pipe 602 from the metal housing 404 while allowing continuous transfer of current from the teck cable 402, to the conductive lug 104, to the flange tab 406, to the pipe flange 604 and finally to the pipe 602.

The foregoing descriptions of specific embodiments of the present invention have been presented for purposes of illustration and description. They are not intended to be exhaustive or to limit the invention and method of use to the precise forms disclosed. Obviously, many modifications and variations are possible considering the above teaching. As can be understood, the examples described above are intended to be exemplary only.

The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

The terms "connected", "attached", "affixed" or "coupled to" may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A cable-to-pipe connector for providing continuous transfer of current from a cable to a utility pipe in above grade and below grade systems, comprising:
    a conductive lug comprising a head at a top end of said conductive lug affixed to a noncircular neck that is further affixed to a body in a linear formation, said head, said neck and said body having decreasing diameters when viewed along an axis extending from said top end, respectively;
    an insulating shell partially encased by said conductive lug;
    a horizontal aperture at a midway point of said head;
    a first fastener extending from above a top of said head through said horizontal aperture,
    wherein said first fastener is coupled to said head to be threaded inward to block said horizontal aperture and to be threaded outward to be removed from said head;
    a threaded member at a base end of said conductive lug; wherein said threaded member may be coupled to one or more second fasteners; and
    a noncircular center channel through a top end of said insulation shell and a bottom end of said insulation shell,
wherein said conductive lug is inserted into said insulation shell such that said threaded member protrudes outward from said bottom end of said insulation shell, said neck is secured to said noncircular center channel and said conductive lug is unable to rotate and a bottom end of said head lays flush against said top end of said insulation shell.

2. The cable-to-pipe connector of claim 1, wherein said insulating shell is composed of a non-conductive material.

3. The cable-to-pipe connector of claim 1, wherein said insulating shell is black.

4. The cable-to-pipe connector of claim 1, wherein said conductive lug is composed of stainless steel.

5. The cable-to-pipe connector of claim 1, wherein said neck and said center channel are hexagonal-shaped.

6. A method of employing the cable-to-pipe connector of claim 1 to a cable-to-pipe cathodic system to eliminate voltage/amperage from conducting on or through a metal housing or a metal cable sheathing, the method comprising:
    inserting a portion of said cable-to-pipe connector into a metal house connected to said cable such that said head of said conductive lug and a portion of said insulating shell are contained within said metal housing and a remaining portion of said insulating shell and said threaded member of said conductive lug are outside of said metal housing;
    placing a wire from said cable within said metal housing into said horizontal aperture of said conductive lug;
    securing said wire to said conductive lug via said first fastener; and
    connecting a flange tab that is coupled to said pipe to said threaded member via said one or more second fasteners.

7. The method of employing the cable-to-pipe connector to a cable to pipe cathodic system of claim 6, wherein said wire is an electrical wire.

8. The method of employing the cable-to-pipe connector to a cable to pipe cathodic system of claim 6, wherein said wire is a cathodic wire.

* * * * *